(12) United States Patent
Raszkowski et al.

(10) Patent No.: US 7,284,313 B2
(45) Date of Patent: Oct. 23, 2007

(54) METHOD FOR ASSEMBLING A HYBRID ELECTRO-MECHANICAL TRANSMISSION

(75) Inventors: James A. Raszkowski, Indianapolis, IN (US); Edward L. Kaiser, Rochester Hills, MI (US); Anthony P. Tata, Fenton, MI (US); Kyle K. Kinsey, Fenton, MI (US); Joel E. Mowatt, Zionsville, IN (US); Fredrick R. Poskie, Plymouth, MI (US); James W. Haynes, Saline, MI (US)

(73) Assignees: General Motors Corporation, Detroit, MI (US); DaimlerChrysler AG, Stuttgart (DE); DaimlerChrysler Corporation, Auburn Hills, MI (US)

( * ) Notice: Subject to any disclaimer, the term of this patent is extended or adjusted under 35 U.S.C. 154(b) by 234 days.

(21) Appl. No.: 11/061,322

(22) Filed: Feb. 18, 2005

(65) Prior Publication Data
US 2005/0206134 A1 Sep. 22, 2005

Related U.S. Application Data

(60) Provisional application No. 60/555,270, filed on Mar. 22, 2004.

(51) Int. Cl.
*H02K 15/00* (2006.01)
(52) U.S. Cl. .................. 29/596; 29/428; 29/469; 74/730.1; 180/65.2; 180/65.6; 280/728.2; 296/192; 296/203.02

(58) Field of Classification Search .................. 29/596, 29/428, 469; 74/730.1; 180/65.2, 65.6; 280/728.2; 296/192, 203.02; 477/3, 5; 903/910, 903/926
See application file for complete search history.

(56) References Cited

U.S. PATENT DOCUMENTS

| | | | | | |
|---|---|---|---|---|---|
| 5,558,595 | A | * | 9/1996 | Schmidt et al. | 477/3 |
| 6,880,429 | B1 | * | 4/2005 | Daniel et al. | 74/730.1 |
| 7,118,166 | B2 | * | 10/2006 | Seksaria et al. | 296/192 |

* cited by examiner

*Primary Examiner*—A. Dexter Tugbang
*Assistant Examiner*—Tim Phan

(57) ABSTRACT

A hybrid transmission including two electric motors and a plurality of planetary gear sets operatively connectable to the motors and to an engine is provided. Novel motor features are provided including structure adapted to improve reliability and to facilitate assembly. More precisely, a method is provided for locating and installing the components of a motor, including a rotor and a stator, within a covered housing to form a motor module. A plurality of rotor bearings and a position/speed sensor are also preferably added to the motor module. After the motor module is assembled, the motor may be tested and thereafter the motor module can be installed into a hybrid transmission as a single component utilizing conventional transmission assembly methods.

11 Claims, 4 Drawing Sheets

METHOD FOR ASSEMBLING A HYBRID ELECTRO-MECHANICAL TRANSMISSION

CROSS REFERENCE TO RELATED APPLICATIONS

This application claims the benefit of U.S. Provisional Application No. 60/555,270, filed Mar. 22, 2004, which is hereby incorporated by reference in its entirety.

TECHNICAL FIELD

This invention relates to a motor module for a hybrid electro-mechanical vehicular transmission.

BACKGROUND OF THE INVENTION

Assembling a hybrid transmission typically includes individually installing the electric motor components into the transmission housing and thereafter testing the electric motors to ensure they perform satisfactorily. As the electric motors are magnetized, precisely assembling the components thereof within the hybrid transmission can be difficult and labor intensive.

SUMMARY OF THE INVENTION

A hybrid transmission including two electric motors and a plurality of planetary gear sets operatively connectable to the motors and to an engine is provided. Novel motor features are provided including structure adapted to improve reliability and to facilitate assembly. More precisely, a method is provided for locating and installing the components of a motor, including a rotor and a stator, within a covered housing to form a motor module. A plurality of rotor bearings and a position/speed sensor are also preferably added to the motor module. After the motor module is assembled, the motor may be tested and thereafter the motor module can be installed into a transmission housing as a single component.

The apparatus of the present invention includes a motor module for a hybrid transmission. The motor module includes a generally cylindrical module housing defining an outer diameter and an inner diameter. The module housing has an open end and an enclosed end opposite the open end. The module housing includes a spline at an internal portion of the outer diameter of the housing. The module housing also includes a locating shoulder at the internal portion of the outer diameter of the housing. A motor assembly is disposed within the module housing such that the motor assembly is axially located by the locating shoulder and radially oriented by the spline. The motor assembly includes a stator and a rotor circumscribed by the stator. A housing cover is preferably attached to the open end of the module housing to enclose the motor assembly. The housing cover includes a plurality of tabs adapted to facilitate the attachment of the motor module to the transmission housing. According to a preferred embodiment, the rotor bearings and position/speed sensor are integrally retained by the module housing and/or housing cover.

The motor assembly is preferably interference fit into the housing, and the housing is preferably slip fit into the hybrid transmission. The housing may be covered by bolting the housing cover thereto after the motor has been inserted so that the cover may be removed, for example, if it becomes necessary to repair the motor. According to a preferred embodiment, a spring washer is mounted between one of the plurality of rotor bearings and the housing cover.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2A is a schematic fragmentary cross-sectional view of a motor assembly and a module housing of the transmission of FIG. 1;

DESCRIPTION OF THE PREFERRED EMBODIMENTS

Figure 1:
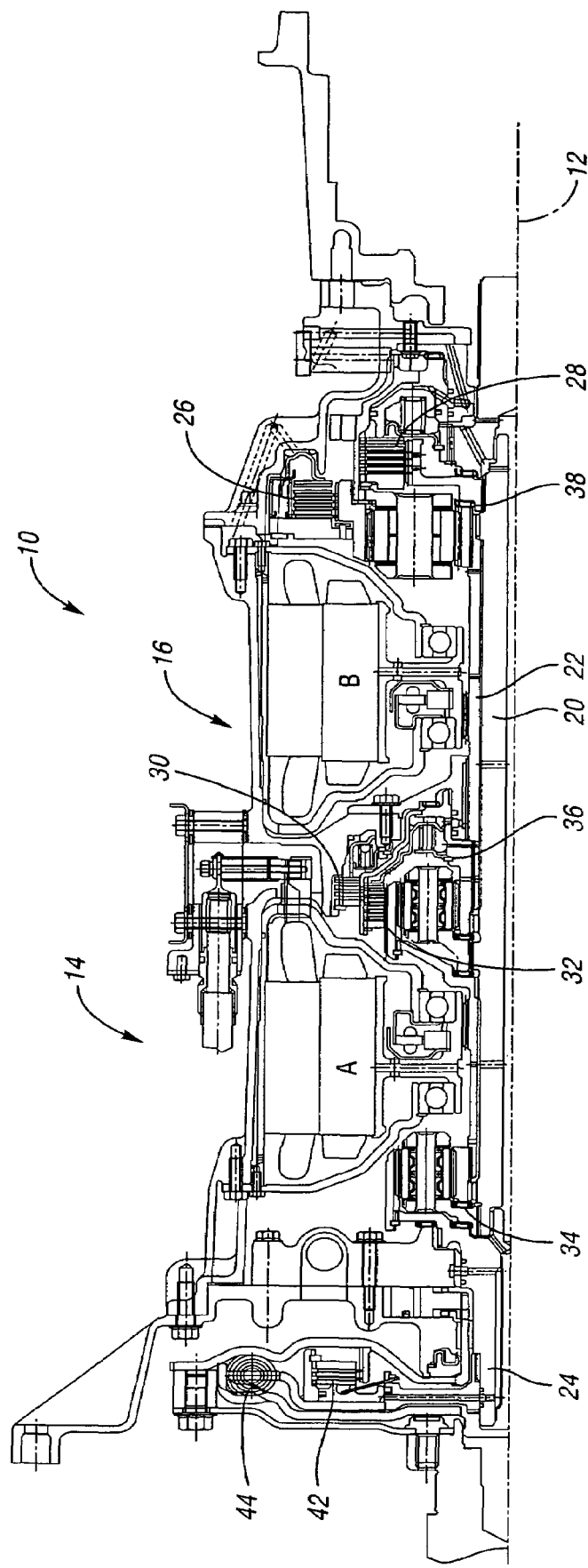
FIG. 1 is a schematic fragmentary cross-sectional view of a hybrid electromechanical transmission.

Referring to the drawings, wherein like reference numbers refer to like components, FIG. 1 shows the upper half of a transmission 10, in cross sectional view. The lower half of the transmission (not shown) is disposed on the opposite side of center axis 12. First and second electric motor modules 14, 16, respectively, are disposed about the center axis 12 within the transmission 10. A main shaft 20 is longitudinally disposed, rotatable about the center axis 12. A plurality of inner shafts, such as inner shaft 22, are concentrically disposed about the main shaft 20, and are likewise rotatable about the center axis. An input shaft 24 is disposed forward of the main shaft 20 and is operable for transferring power from an engine (not shown) to the transmission 10. Engagement of one or more of a plurality of clutches included in the transmission 10 (first, second, third and fourth clutches, 26, 28, 30 and 32 respectively, being shown) interconnects one or more of first, second and third planetary gear sets 34, 36, and 38, respectively, to transfer power at varying ratios to an output member (not shown). As will be readily understood by those skilled in the art, each of the planetary gear sets includes a sun gear member, a planet carrier assembly member and a ring gear member. A fifth clutch, referred to as a lockout clutch 42, is operable for locking out torsion isolator 44 (also referred to as damper springs) from surrounding structural elements, and to provide a direct connection between the engine and transmission.

Figure 2:
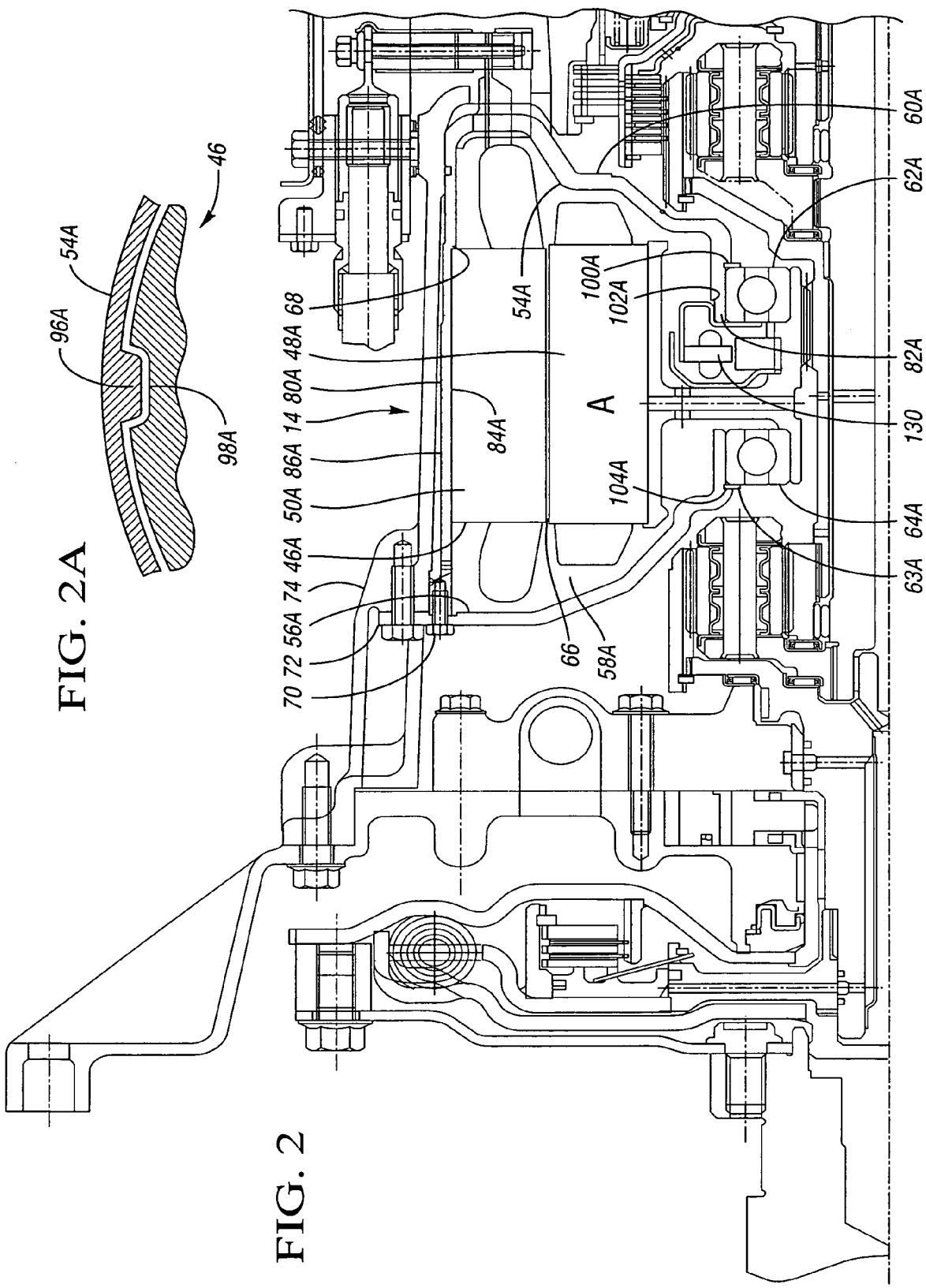
FIG. 2 is a schematic fragmentary cross-sectional view of a frontward portion of the transmission of FIG. 1.
Figure 3:
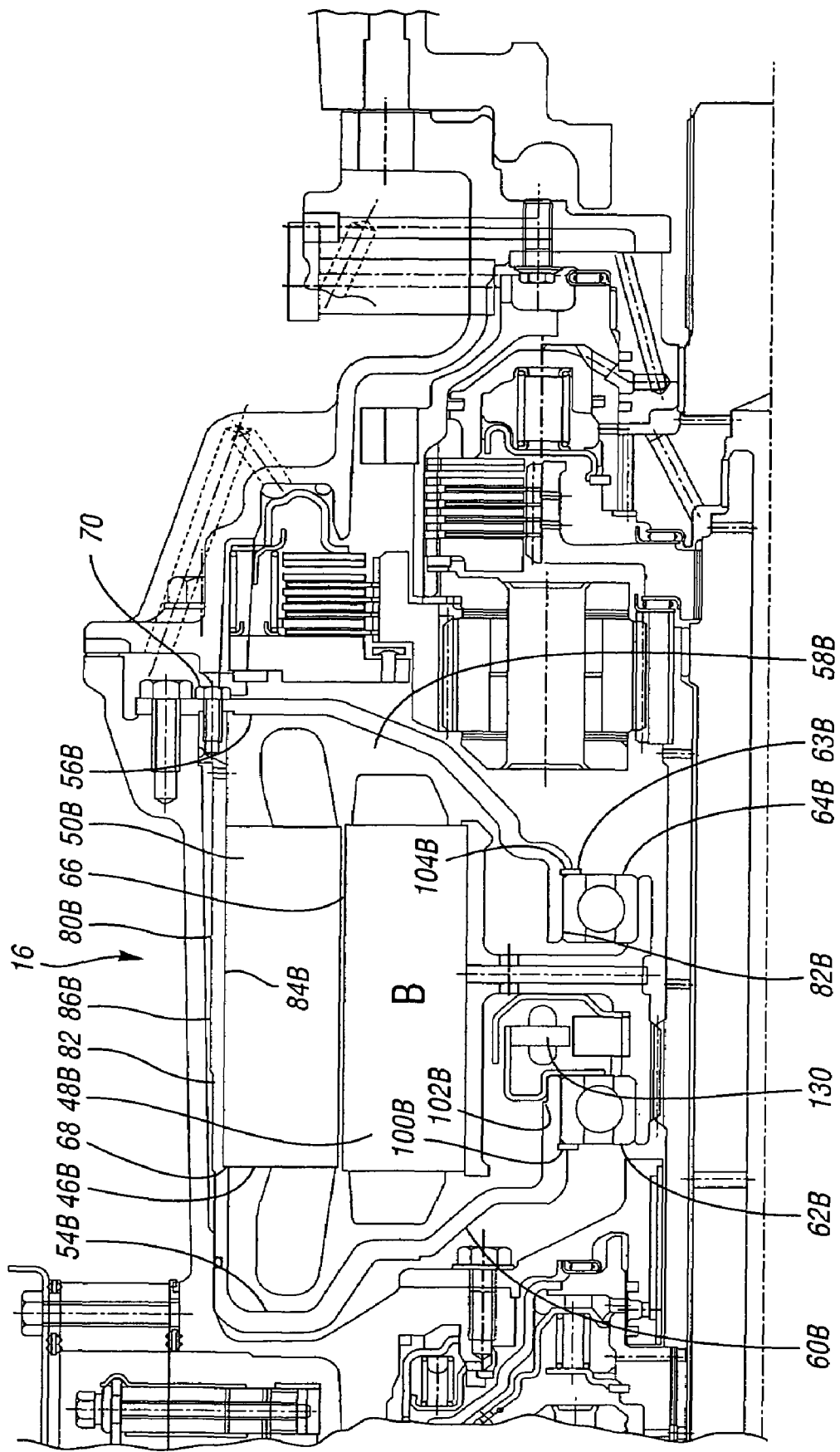
FIG. 3 is a schematic fragmentary cross-sectional view of a rearward portion of the transmission of FIG. 1.

Referring to FIGS. 2 and 3, the first and second motor modules 14, 16, respectively, are each self-contained assemblies. The motor modules 14, 16 each include a motor 46A, 46B, respectively. The motors 46A, 46B each include a rotor 48A, 48B and a stator 50A, 50B, respectively.

The motors 46A, 46B are preferably enclosed within a drum comprised of a generally cylindrical module housing 54A, 54B and a module housing cover 56A, 56B. Each module housing 54A, 54B includes an open end 58A, 58B adapted to facilitate the insertion of a motor, and an enclosed end 60A, 60B. The module housings 54A, 54B define outer diameters 80A, 80B, and inner diameters 82A, 82B, respectively. The outer diameters 80A, 80B of the module housings 54A, 54B include an internal surface 84A, 84B and an external surface 86A, 86B. The module housing covers 56A, 56B are respectively attached to the open end 58A, 58B of the module housing 54A, 54B after the motors 46A, 46B have been inserted therein as will be described in detail hereinafter. According to a preferred embodiment, the housing 54A, 54B is composed of formed steel and the cover 56A, 56B is stamped steel, however, it should be appreciated that the housing and cover may be composed of alternate materials and/or fabricated according to other known manufacturing processes. As the motors 46A, 46B are completely enclosed, the risk of contamination by debris is reduced. This is particularly advantageous for the electric motors 46A, 46B of the present invention in that the motors are magnetized and therefore prone to attracting contaminants.

The modules 14, 16 are preferably pre-assembled prior to installation in the transmission 10. Additionally, the pre-assembled modules may be independently tested for compliance with performance requirements prior to installation. In this manner, assembly of the hybrid transmission is simplified by the installation of pre-assembled and pre-tested modules 14, 16 instead of a plurality of motor components that require additional testing.

Referring to FIG. 2, the stator 50A is preferably interference fit into the module housing 54A. As is known in the art, an interference fit is one wherein the outer diameter of the stator 50A is larger than the inner diameter of the module housing 54A such that there is an interference therebetween when the parts are assembled. According to a preferred embodiment of the present invention, the size of the module housing 54A is increased by heating, and the size of the stator 50A is reduced by cooling. Thereafter, the undersized stator 50A is inserted into the oversized module housing 54A such that when the components reach ambient temperature there is an interference fit maintaining engagement. The motor module 14 is preferably slip fit into the transmission housing 74, which allows simple installation and removal of the stator 50A. A slip fit is a more conventional type fit wherein there is clearance between components such that they are easily assembled and disassembled. The module housing 54A includes an internal locating shoulder 68 adapted to axially locate the stator 50A. As shown in FIG. 2A, the module housing 54A also includes an internal spline 96A (shown in FIG. 2A) adapted to engage a corresponding feature 98A of the motor assembly 46A for radial orientation.

Referring again to FIG. 2, the housing 54A includes an external shoulder portion 100A adapted to provide integral support for a rotor bearing 62A. The housing 54A also preferably includes an internal shoulder portion 102A adapted to integrally retain a position/speed sensor 130. A second rotor bearing 64A is supported by an external shoulder portion 104A of the housing cover 56A. A spring washer 63A is preferably disposed between the rotor bearing 64A and either the housing cover 56A or the housing 54A, and applies a pre-load adapted to control axial motion of the motor module 14. The housing 54A and housing cover 56A with integral rotor bearings 62A, 64A will more precisely control the concentricity of the stator 50A and rotor 48A than could be accomplished with non-integral bearings because the present design implements fewer components (devices for mounting and retaining the rotor bearing are unnecessary), such that the tolerance stack-up is reduced. This leads to improved performance of the motor 46A by allowing a smaller air gap 66 between the stator 50A and the rotor 48A.

The cover 56A is preferably piloted on and bolted to the open end 58A of the module housing 54A with bolts 70 so that the cover 56A is removable if, for example, it becomes necessary to repair the motor 46A. It should be appreciated, however, that the cover 56A may alternatively be attached to the module housing 54A in any-conventional manner.

Figure 4:
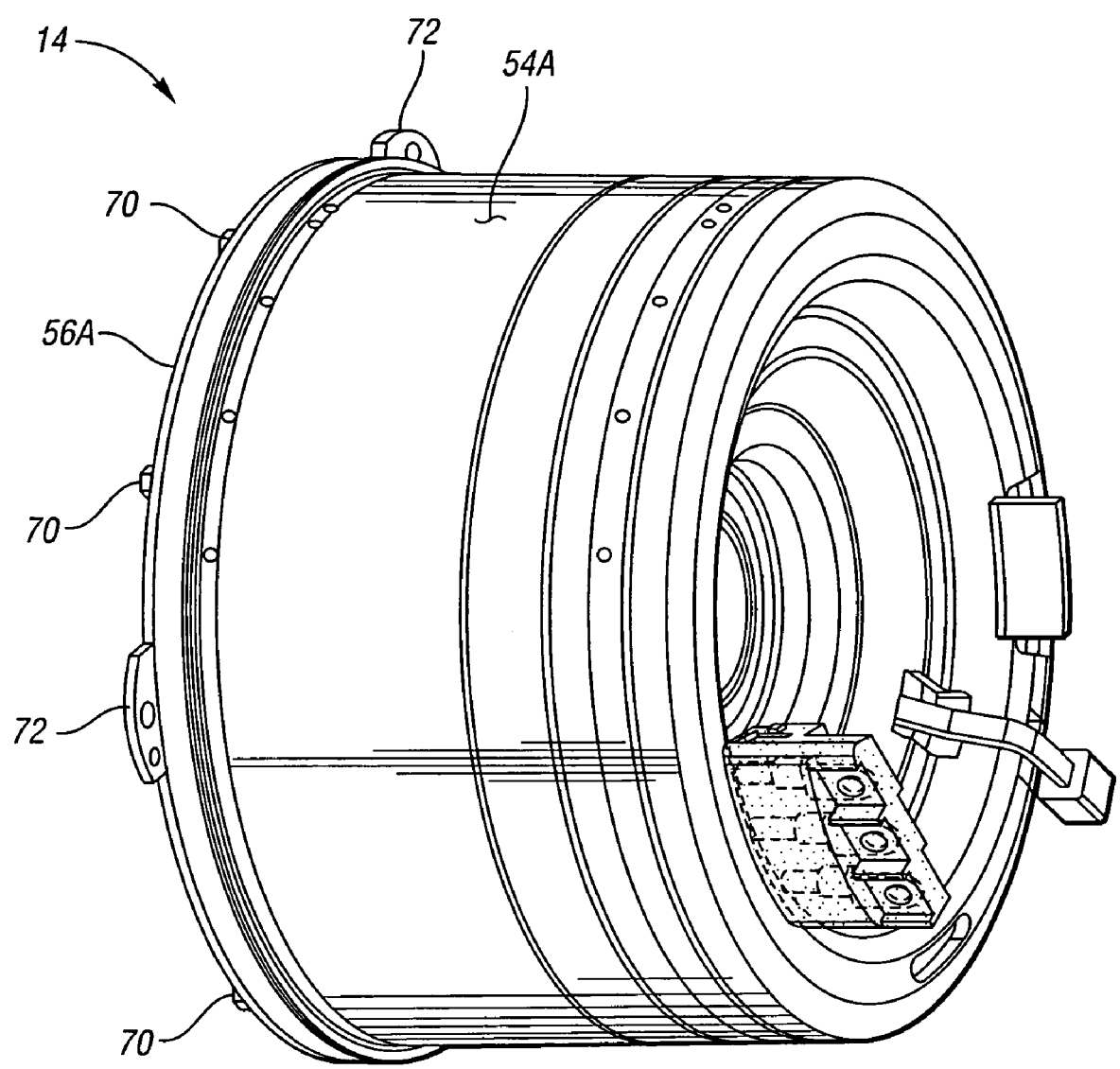
FIG. 4 is a schematic perspective view of a housing and attached cover for a motor module used in the transmission of FIG. 1.

As best shown in FIG. 4, the attached housing 54A and cover 56A, containing the rotor/stator assembly 48A, 50A (shown in FIG. 2) create a self-contained motor module 14 that may be tested prior to installation in the transmission housing 74 (shown in FIG. 2). Additionally, the attached housing 54A and cover 56A will help exclude debris from the motor module 14, both during shipping and handling and after installation. Debris will be prevented from entering the air gap 66 between the rotor 48A and stator 50A (shown in FIG. 2), thereby enhancing motor performance.

The housing cover 56A also has three external mounting tabs 72 (one shown) radially spaced about the cover that allow the motor module 14 to be bolted to the transmission main housing 74. The mounting tabs 72 provide easily accessible attachment and facilitate the absorption of stator torque by the transmission housing 74. The second motor module 16 of FIGS. 1 and 3 has structural characteristics similar to those described hereinabove for motor module 14.

While the best modes for carrying out the invention have been described in detail, those familiar with the art to which this invention relates will recognize various alternative designs and embodiments for practicing the invention within the scope of the appended claims.

The invention claimed is:

1. A method for assembling a hybrid transmission, said hybrid transmission having a transmission housing, the method comprising:
    assembling a motor module including:
        inserting a motor assembly into a module housing;
        axially locating the motor assembly relative to the module housing;
        radially positioning the motor assembly relative to the module housing;
        mounting a housing cover to the module housing;
    testing the motor module; and
    attaching the motor module to an inside portion of the transmission housing between a transmission input member and a transmission output member after the motor module has been assembled and tested.

2. The method of claim 1 wherein said inserting the motor assembly within the module housing includes interference fitting the motor assembly into the module housing.

3. The method of claim 2, wherein said interference fitting the motor assembly into the module housing includes heating the module housing and cooling the motor assembly.

4. The method of claim 1 wherein said attaching the motor module to the transmission housing includes slip fining the motor module into the transmission housing.

5. The method of claim 1 wherein said mounting the housing cover to the module housing includes bolting the housing cover to the module housing.

6. The method of claim 1 wherein said assembling the motor module includes attaching a first rotor bearing to said module housing.

7. The method of claim 6 wherein said assembling the motor module further includes attaching a second rotor bearing to said module housing cover.

8. The method of claim 7 wherein said assembling the motor module includes attaching a spring washer between said second rotor bearing and said module housing cover.

9. The method of claim 8 wherein said assembling the motor module includes attaching a sensor to said module housing.

10. The method of claim 1, wherein said radially positioning the motor assembly relative to the module housing includes engaging an internal spline of said module housing with a spline feature of said motor assembly.

11. The method of claim 1, wherein said axially locating the motor assembly relative to the module housing includes butting the motor assembly against an internal locating shoulder of said module housing.

* * * * *